(12) United States Patent
Kimura et al.

(10) Patent No.: US 10,996,087 B2
(45) Date of Patent: May 4, 2021

(54) ELECTROPOTENTIAL DETECTION ELECTRODE OF ELECTROMAGNETIC FLOW METER

(71) Applicant: Azbil Corporation, Tokyo (JP)

(72) Inventors: Koji Kimura, Tokyo (JP); Kazuko Okuhata, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 256 days.

(21) Appl. No.: 16/219,251

(22) Filed: Dec. 13, 2018

(65) Prior Publication Data

US 2019/0186964 A1    Jun. 20, 2019

(30) Foreign Application Priority Data

Dec. 15, 2017  (JP) .............................. JP2017-240924

(51) Int. Cl.
*G01F 1/58*  (2006.01)
*G01N 27/06*  (2006.01)
*G01F 1/60*  (2006.01)

(52) U.S. Cl.
CPC .............. *G01F 1/584* (2013.01); *G01F 1/588* (2013.01); *G01F 1/60* (2013.01); *G01N 27/06* (2013.01)

(58) Field of Classification Search
None
See application file for complete search history.

(56) References Cited

U.S. PATENT DOCUMENTS

| 3,771,361 A * | 11/1973 | Reznick | ................... G01F 1/584 |
|---|---|---|---|
| | | | 73/861.12 |
| 2004/0149046 A1 * | 8/2004 | Yamazaki | ............... G01F 1/588 |
| | | | 73/861.12 |

(Continued)

FOREIGN PATENT DOCUMENTS

| CN | 206132144 U | 4/2017 |
|---|---|---|
| EP | 2 583 067 B1 | 7/2019 |

(Continued)

OTHER PUBLICATIONS

The State Intellectual Property Office of People's Republic of China, "The First Office Action", issued in Chinese Patent Application No. 201811523821.8, which is a counterpart to U.S. Appl. No. 16/219,251, dated Mar. 23, 2020, 15 pages (9 pages of English Translation of Office Action and 6 pages of Original Chinese Office Action).

*Primary Examiner* — Harshad R Patel (57) ABSTRACT

A liquid-contact portion exposed into a measurement tube is provided, and a main body portion formed by covering a base material with a conductor is provided. A terminal portion electrically connected to the conductor is provided. The main body portion includes a small diameter portion having a cylindrical shape and being inserted at one end thereof into an electrode insertion hole of the measurement tube, and the one end corresponds to the liquid-contact portion; and a large diameter portion having a disc shape extending outward from the other end of the small diameter portion in a radial direction. The large diameter portion includes an annular groove opened toward inside a measurement, tube, and cutaway's extending outward from the annular groove in the radial direction and opening to an outer peripheral surface of the large diameter portion.

2 Claims, 6 Drawing Sheets

(56) References Cited

U.S. PATENT DOCUMENTS

| | | | |
|---|---|---|---|
| 2011/0041620 A1* | 2/2011 | Izumi | G01F 1/584 |
| | | | 73/861.12 |
| 2013/0086993 A1 | 4/2013 | Kerrom et al. | |
| 2017/0350738 A1* | 12/2017 | Heizenroeder | G01F 1/584 |
| 2019/0186963 A1* | 6/2019 | Okuhata | G01F 1/584 |
| 2019/0186965 A1* | 6/2019 | Kimura | G01F 23/24 |
| 2019/0186966 A1* | 6/2019 | Kimura | G01F 23/24 |

FOREIGN PATENT DOCUMENTS

| | | |
|---|---|---|
| JP | H02-16024 U | 2/1990 |
| JP | 2018-146274 A | 9/2018 |

* cited by examiner

ELECTROPOTENTIAL DETECTION ELECTRODE OF ELECTROMAGNETIC FLOW METER

CROSS-REFERENCE TO RELATED APPLICATION

The present application claims the benefit of and priority to Japanese Patent Application No. 2017-240924, filed on Dec. 15, 2017, the entire contents of which are incorporated by reference herein.

TECHNICAL FIELD

The present invention relates to an electropotential detection electrode of an electromagnetic flow meter, which has a main body portion comprising a liquid-contact portion covered with an electrically conductive material.

BACKGROUND

Some electromagnetic flow meters of the related art are configured to extract an electromotive force generated in a fluid flowing in a measurement tube by using an electropotential detection electrode. The electropotential detection electrode, typically made of a stainless steel, is made of various materials depending on corrosiveness of detection targets. Examples of electrode materials having high corrosive resistance include precious metal materials such as platinum as disclosed, for example, in PTL 1 in many cases. The precious metal materials have such a disadvantage as having difficulty to achieve desired shapes depending on the shape due to their low strength. In order to solve the disadvantage described above, forming an electrode by using a non-precious metal material as a base metal and covering the electrode with a precious metal material is conceivable as described in PTL 1.

However, when an abrasive substance is included in the fluid flowing in the measurement tube, the precious metal material covering the electrode may be peeled off. In addition, the precious metal material covering the electrode may be peeled off due to an impact applied to the measurement tube, corrosion of the measurement tube, or a defect at the time of manufacture.

When the precious metal material is peeled off, an electrochemical noise is generated due to an electropotential difference between the base metal and the precious metal material. This noise corresponds to an output noise from the electromagnetic flow meter.

Figure 8:
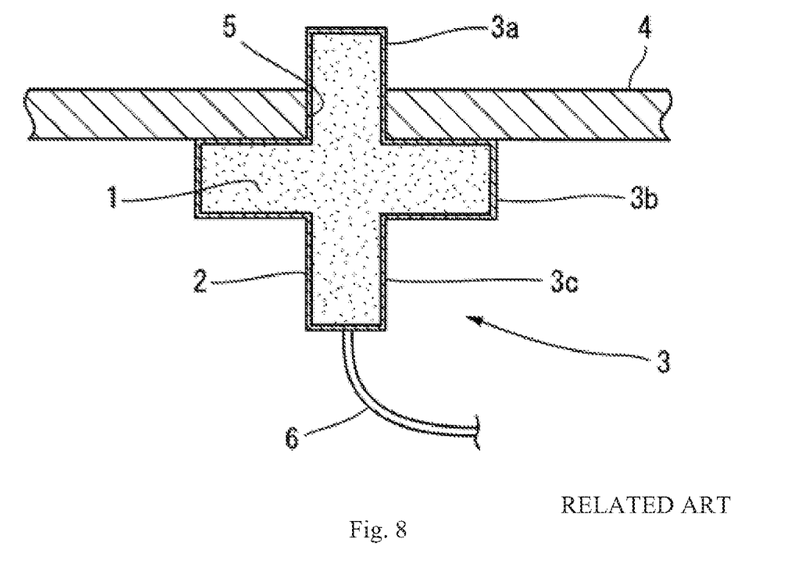
FIG. 8 is a cross-sectional view of an electropotential detection electrode of the related art.

The problem of generation of the noise due to peeling off of the metal material that covers the electrode may be solved by making an electrode body with an insulating material, covering a surface of the insulating material with a precious metal material, and using the precious metal material as a conduction path as proposed by an applicant of the present application in PTL 2. Described in PTL 2 is an electropotential detection electrode 3 having such structure that a base material 1 made of a ceramic, which is an insulating material, is covered with a conductor 2 made of a metal having corrosive resistance as illustrated in FIG. 8. The electropotential detection electrode 3 includes a first small diameter portion 3a to be inserted into a hole 5 formed in a measurement tube 4 for inserting an electrode, a large diameter portion 3b located outside the measurement tube 4, and a second small diameter portion 3c projecting from the large diameter portion 3b in a direction opposite from the first small diameter portion 3a. A lead wire 6 is connected to the second small diameter portion 3c.

Figure 9:
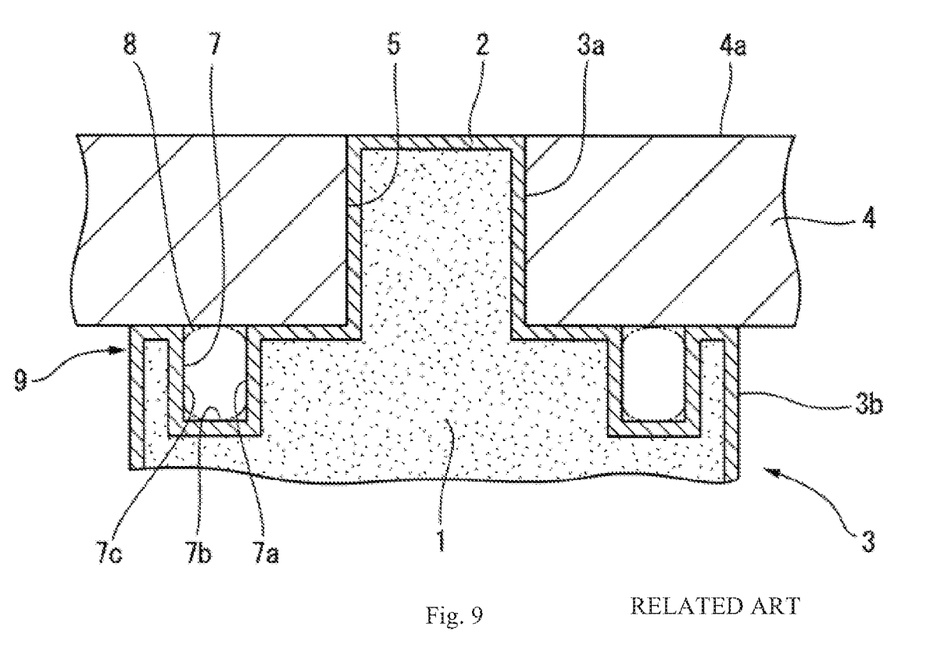
FIG. 9 is a cross-sectional view of an electropotential detection electrode having an annular groove of the related art.

The large diameter portion 3b may be provided with an annular groove 7 as illustrated in FIG. 9. In FIG. 9, the same or similar members as or to those described in conjunction with FIG. 8 are denoted by the same reference signs and detailed description will be omitted. The annular groove 7 is configured to store a gasket 8, and is formed into an annular shape and located on the same axial line as the first small diameter portion 3a. The gasket 8 is configured to seal between a fluid path 4a in the measurement tube 4 and the large diameter portion 3b of the electropotential detection electrode 3.

In this manner, the conductor 2 of the electropotential detection electrode 3 provided with the annular groove 7 is preferably formed by using a metal paste (not illustrated) so that an inner peripheral surface 7a, a bottom surface 7b, and an outer peripheral surface 7c of the annular groove 7 are uniformly covered. The metal paste contains metal powder, and is formed into the conductor 2 by being sintered together with the base material 1 in a state of being applied to the base material 1 and being subjected to metal paste sintering.

CITATION LIST

Patent Literature

[PTL 1] JP-UM-A-2-16024
[PTL 2] Japanese Patent Application No. 2017-038984

SUMMARY

Figure 10:
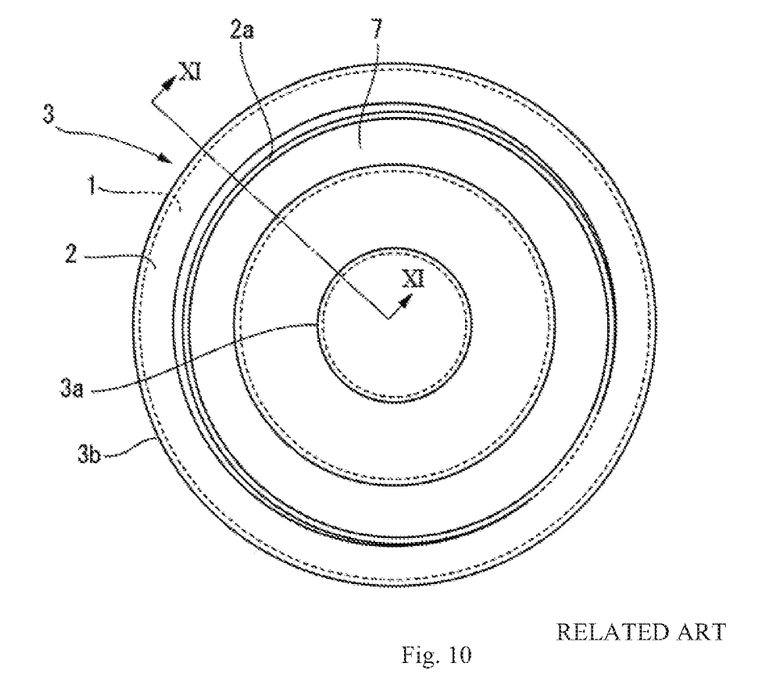
FIG. 10 is a front view of the electropotential detection electrode of the related art with part of a conductor being peeled off.
Figure 11:
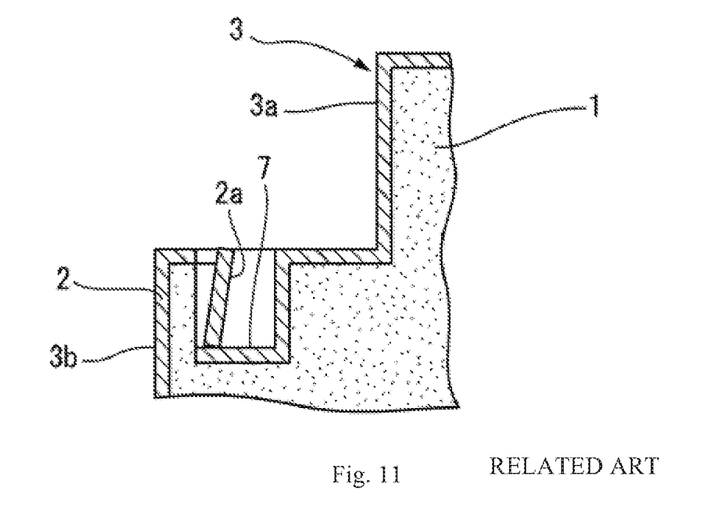
FIG. 11 is a cross-sectional view taken along the line XI-XI in FIG. 10.

As illustrated in FIG. 9, the electropotential detection electrode 3, comprising the annular groove 7, is covered with the conductor 2, and part 2a of the conductor 2 may be peeled off an outer peripheral wall of the annular groove 7, as illustrated in FIG. 10 and FIG. 11. It is because a material having a large linear expansion coefficient contracts to a larger extent due to a difference in linear expansion coefficient during sintering, which generates a contract stress. The contract stress is directed inward in a radial direction. In other words, when the adhesiveness between the base material 1 made of a ceramic and the conductor 2 of the large diameter portion 3b is insufficient, the conductor 2 contracts more than the base material 1, and thus the conductor 2 is peeled off the outer peripheral wall of the annular groove 7 inwardly in the radial direction.

In addition, the conductor 2 tends to be reduced in thickness at corners, projecting outward, of the electropotential detection electrode 3 and thus may fail to have sufficient thickness required for detecting signals. When the thickness is reduced at the corners, reliability in conduction is lowered, and thus conductivity required for detecting signals is not achieved. As illustrated in FIG. 9, when the annular groove 7 is formed in the large diameter portion 3b, a cylindrical portion 9 is formed outside the annular groove 7 in the radial direction, and thus the number of corners with less thickness of the conductor 2 increases correspondingly, which may result in lower reliability in conduction. The problem of reliability as described above occurs not only in the electropotential detection electrode 3 having the annular groove 7 for storing the gasket 8, but also in electrodes provided with an annular groove for other reasons.

It is an object of the present invention to provide an electropotential detection electrode having a high reliability in conduction irrespective of the presence of an annular groove covered with a conductor.

In order to achieve the object of the present invention, there is provided an electropotential detection electrode of an electromagnetic flow meter of the present invention comprising: a main body portion having a liquid-contact portion and being formed by covering a base material with an electrically conductive material, the liquid-contact portion being exposed in a measurement tube of the electromagnetic flow meter; and a terminal portion electrically connected to the electrically conductive material, in which the main body portion comprises: a small diameter portion having a cylindrical shape and being inserted at one end thereof into an electrode insertion hole of the measurement tube, the one end corresponding to the liquid-contact portion; and a large diameter portion having a disc shape extending outward from the other end of the small diameter portion in a radial direction, and the large diameter portion comprises: an annular groove opening toward inside the measurement tube, and a cutaway extending outward from the annular groove in the radial direction and opening to an outer peripheral surface of the large diameter portion.

In the electropotential detection electrode of an electromagnetic flow meter according to the present invention, the large diameter portion may comprise a groove inside the annular groove in the radial direction, the groove being connected at one end thereof to a bottom surface of the annular groove and at the other end to an outer peripheral surface of the small diameter portion.

According to the present invention, the conductor that defines the outer peripheral surface of the large diameter portion and the conductor that defines the bottom surface of the annular groove are connected by the conductor formed on the bottom surface of the cutaway. Therefore, even when the conductor is peeled off the outer peripheral wall of the annular groove, a state of conduction of the main body portion is not affected. In addition, compared with a case where the conductor formed in a cylindrical portion outside the annular groove in the radial direction serves as a conduction path, reliability in conduction is increased as one corner that tends to impair the reliability in conduction is eliminated.

Therefore, according to this embodiment, an electropotential detection electrode of an electromagnetic flow meter, which has high reliability in conduction irrespective of a configuration of the main body portion having the annular groove and being covered with the conductor.

DETAILED DESCRIPTION

First Embodiment

Referring now to FIG. 1 to FIG. 4, an embodiment of an electropotential detection electrode of an electromagnetic flow meter according to the present invention will be described in detail below.

An electropotential detection electrode 11 illustrated in FIG. 1 (hereinafter, referred to simply as an electrode 11) is attached to a measurement tube 13 of an electromagnetic flow meter 12 from outside a fluid path 14.

The measurement tube 13 comprises a main body 15, a lining 16 provided on an inner surface of the main body 15, and an electrode cap 17 having a bottomed cylindrical shape for storing the electrode 11. The lining 16 is integrally provided with an electrode mounting seat 18. The electrode mounting seat 18 is provided with an electrode insertion hole 19 therethrough for inserting the electrode 11.

The electrode 11 according to the embodiment comprises a main body portion 21 inserted into the electrode insertion hole 19 of the lining 16, and a terminal portion 22 formed separately from the main body portion 21 and overlapped with the main body portion 21.

Figure 1:
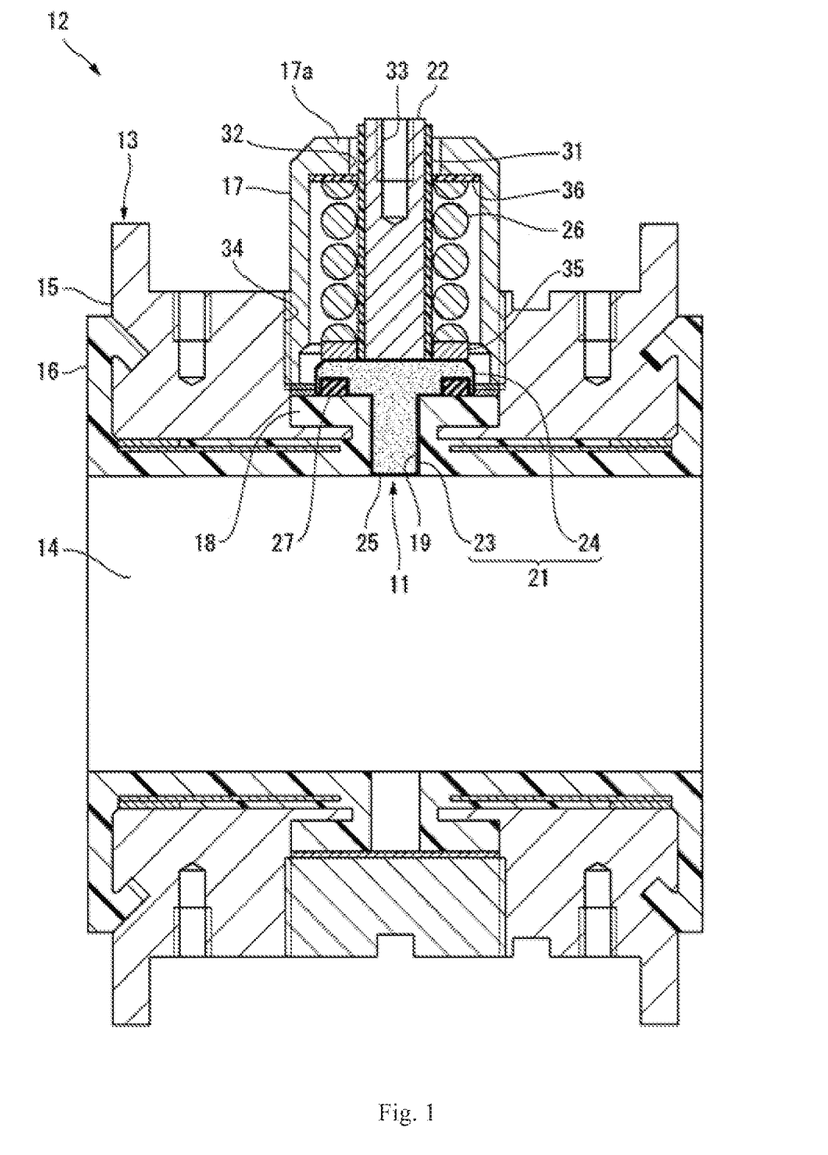
FIG. 1 is a cross-sectional view of an electromagnetic flow meter provided with an electropotential detection electrode according to the present invention.
Figure 2:
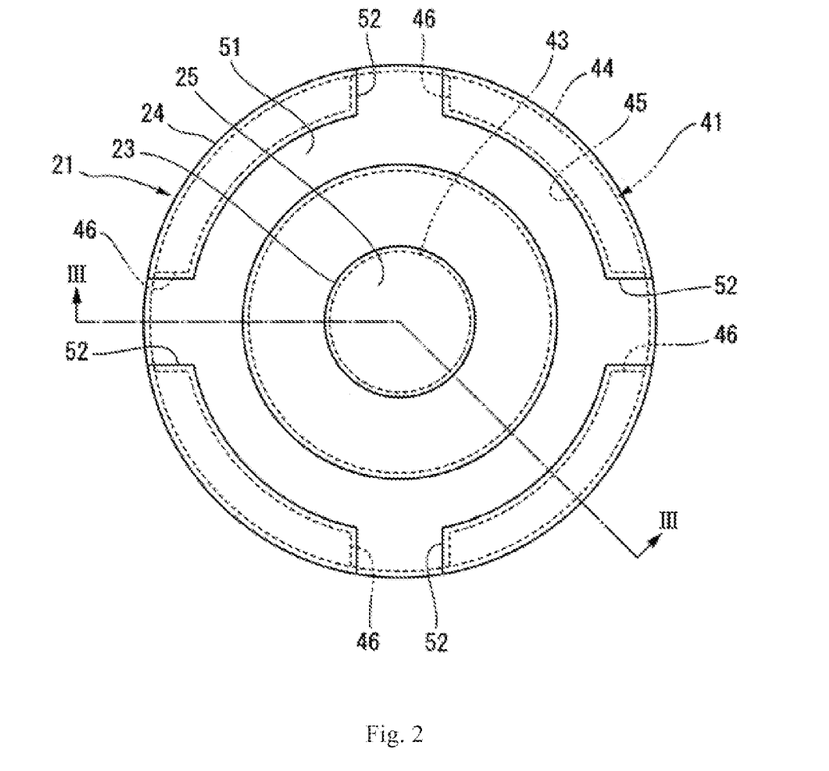
FIG. 2 is a front view of the electropotential detection electrode according to a first embodiment viewed from a pipeline side.
Figure 3:
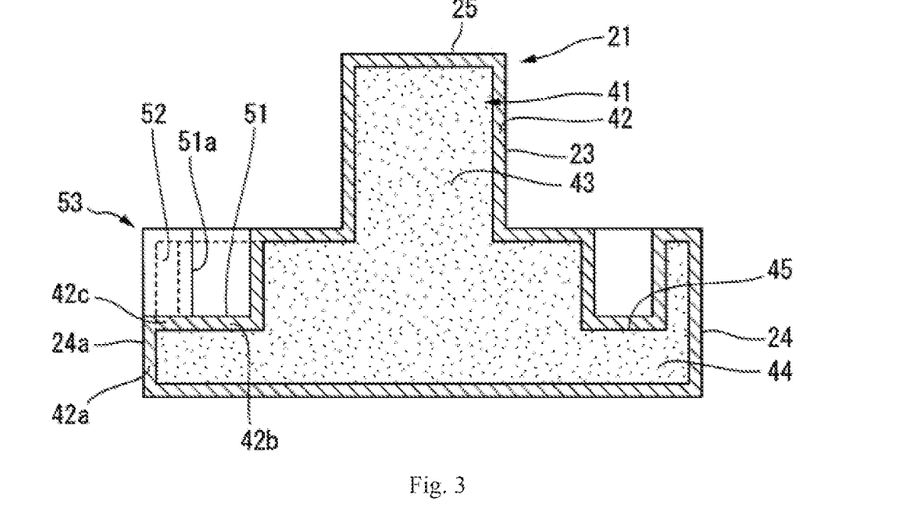
FIG. 3 is a cross-sectional view taken along the line III-III in FIG. 2.

The main body portion 21, which will be described later in detail, comprises a small diameter portion 23 having a cylindrical shape exposed at one end thereof to the fluid path 14 in the measurement tube 13 and a large diameter portion 24 having a disc shape extending from the other end of the small diameter portion 23 outward in the radial direction, as illustrated in FIG. 1 to FIG. 3.

The one end of the main body portion 21 is exposed into the measurement tube 13 and corresponds to a liquid-contact portion 25 that comes into contact with a fluid (not illustrated) flowing in the measurement tube 13. The large diameter portion 24 is formed into a disc shape having an outer diameter larger than the small diameter portion 23 and is urged by a spring force of a compressed coil spring 26, described later, toward the electrode mounting seat 18. A gasket 27 is provided between the large diameter portion 24 and the electrode mounting seat 18.

The terminal portion 22 is made of an electrically conductive material into a cylindrical shape and is mounted to the large diameter portion 24 of the main body portion 21 by a mounting structure, not illustrated.

The terminal portion 22 is covered with a cylindrical body 31 made of an insulating material and penetrates through an end wall 17a of the electrode cap 17 and projects out of the electrode cap 17, as illustrated in FIG. 1. The end wall 17a is provided with a through hole 32 formed therethrough and the terminal portion 22 and the cylindrical body 31 pass through the through hole 32. A projecting side end portion of the terminal portion 22 is formed with a screw hole 33 for connecting a lead wire terminal (not illustrated).

The electrode cap 17 has a function to retain the compressed coil spring 26. The electrode cap 17 is screwed into a screw hole 34 of the main body 15 in a state of storing the compressed coil spring 26 in the interior thereof. The compressed coil spring 26 is compressed in a state in which the terminal portion 22 is inserted through a center portion thereof and is stored in the electrode cap 17. One end of the compressed coil spring 26 presses the large diameter portion 24 of the main body portion 21 toward the electrode mounting seat 18 via a washer 35, and the other end pushes the end wall 17a of the electrode cap 17 in a direction opposite from the main body portion 21 via an annular insulating plate 36.

The main body portion 21 of the electrode 11 comprises a base material 41 made of a ceramic, which is an insulating material, and an electrically conductive material covering the base material 41 as illustrated in FIG. 3. In this embodiment, the electrically conductive material covering the base material 41 is simply referred to as a conductor 42. The terminal portion 22 described above is electrically connected to the conductor 42 by being overlapped with the large diameter portion 24 of the main body portion 21.

Examples of the ceramic material that may be used for the base material 41 include SiC, $Al_2O_3$, $ZrO_2$, $Y_2O_3$, $Si_3N_4$, and SiO. The base material 41 is formed by molding a ceramic raw material into a shape of the main body portion 21 with a die (not illustrated) and is formed by sintering the molded object.

The conductor 42 is made of an electrically conductive material. Examples of the electrically conductive material that may be used for forming the conductor 42 include metal materials having corrosive resistance, such as Pt, Ti, Au, Ta, and WC, and also include solder, a synthetic resin material having electric conductivity, and an electrically conductive ink. The conductor 42 according to this embodiment is formed by sintering a metal paste (not illustrated) applied to the base material 41 before sintering together with the base material 41. The metal paste is formed by mixing metal powder and a solvent. By sintering the metal paste, the metal powder is fused and the conductor 42 covering the entire area of an outer surface of the base material 41 is achieved.

The base material 41 of the main body portion 21 is formed of a cylindrical portion 43 constituting the small diameter portion 23 in cooperation with the conductor 42 described above, and a disc portion 44 constituting the large diameter portion 24 in cooperation with the conductor 42 described above. The cylindrical portion 43 and the disc portion 44 are integrally formed.

Figure 4:
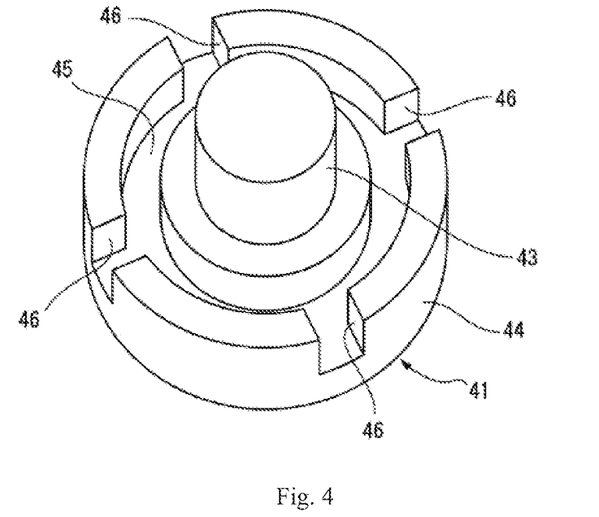
FIG. 4 is a perspective view of a base material according to the first embodiment.

The disc portion 44 comprises an annular groove portion 45, and cut-away portions 46 extending outward from the annular groove portion 45 in the radial direction and opening to an outer peripheral surface of the disc portion 44, as illustrated in FIG. 2 and FIG. 4.

The annular groove portion 45 is configured to store the gasket 27, is positioned on the same axial line as the disc portion 44, and is formed into a shape opening toward the measurement tube 13.

The cut-away portions 46 are provided at positions that quarter the disc portion 44 in a circumferential direction as illustrated in FIG. 2.

In the electropotential detection electrode 11 configured in this manner, the main body portion 21 comprising the base material 41 and the conductor 42 covering the outer surface of the base material 41 is formed by sintering the base material 41 having a metal paste applied on the outer surface thereof. The main body portion 21 comprises the small diameter portion 23 comprising the cylindrical portion 43 of the base material 41 covered with the conductor 42 and the large diameter portion 24 comprising the disc portion 44 of the base material 41 covered with the conductor 42.

As illustrated in FIG. 3, the annular groove portion 45 of the disc portion 44 covered with the conductor 42 defines an annular groove 51 opening toward inside the measurement tube 13 in the large diameter portion 24. The cut-away portions 46 of the disc portion 44 covered with the conductor 42 define cutaways 52 in the large diameter portion 24. The cutaways 52 extend outward from the annular groove 51 in the radial direction and open to an outer peripheral surface 24a of the large diameter portion 24.

Therefore, as illustrated in FIG. 3, a conductor 42a corresponding to the outer peripheral surface of the large diameter portion 24 and a conductor 42b corresponding to a bottom surface of the annular groove 51 in the large diameter portion 24 are connected via a conductor 42c corresponding to bottom surfaces of the cutaways 52 in the large diameter portion 24. In the main body portion 21, even when the conductor 42 that forms an outer peripheral wall 51a of the annular groove 51 is peeled off the base material 41, the conduction state of the main body portion 21 is not affected. In addition, with the main body portion 21, reliability in conduction is increased as one corner that tends to impair the reliability in conduction is eliminated compared with an electrode of the related art, that is, an electrode configured in such a manner that the conductor 42 formed in a cylindrical portion 53 outside the annular groove 51 in the radial direction serves as a conduction path.

Therefore, according to this embodiment, an electropotential detection electrode having high reliability in conduction may be provided irrespective of a configuration having the annular groove 51 covered with the conductor 42.

Second Embodiment

Figure 5:
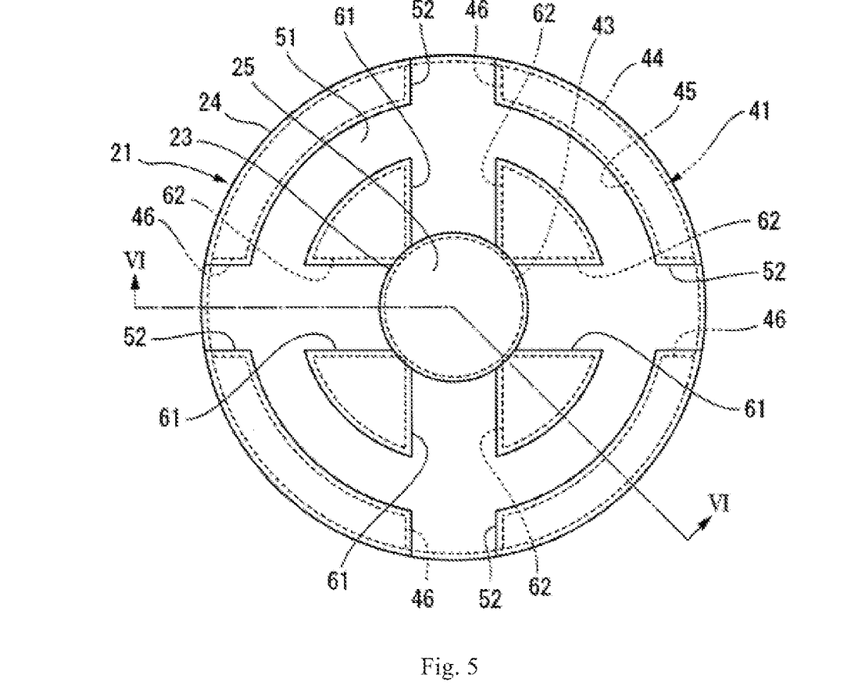
FIG. 5 is a front view of the electropotential detection electrode according to a second embodiment viewed from a pipeline side.
Figure 6:
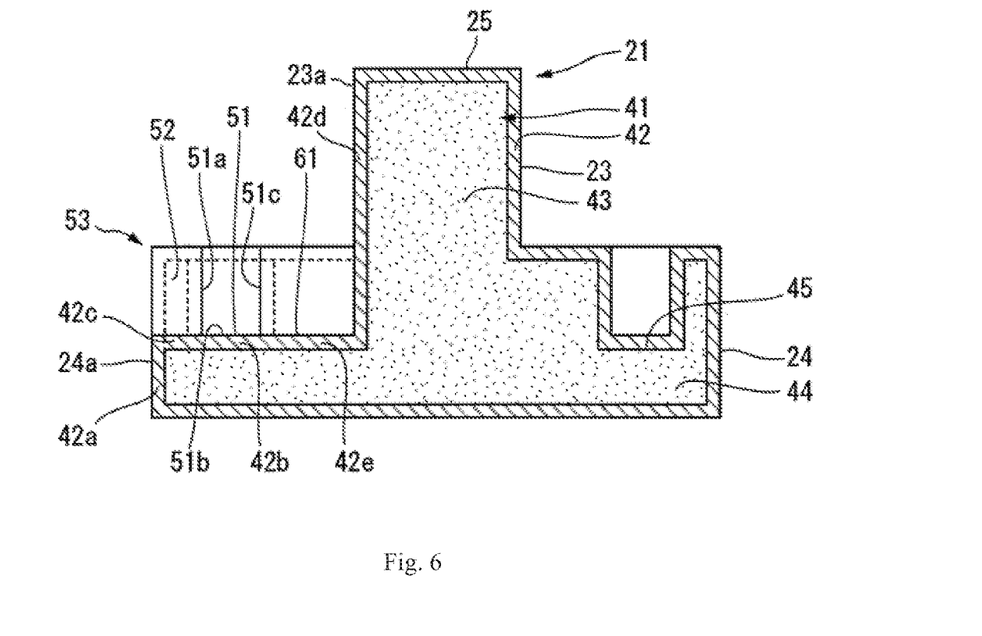
FIG. 6 is a cross-sectional view taken along the line VI-VI in FIG. 5.
Figure 7:
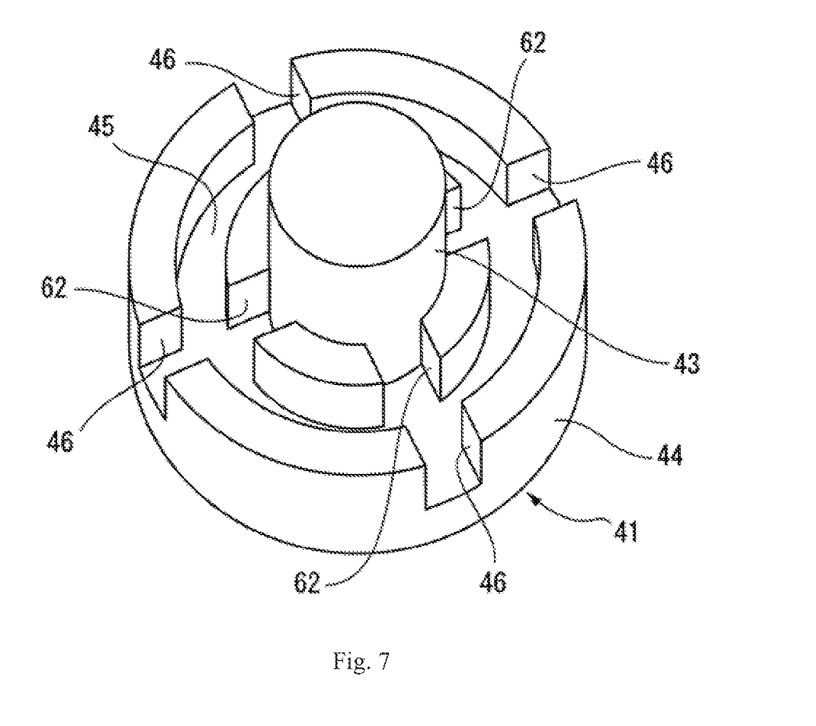
FIG. 7 is a perspective view of the base material according to the second embodiment.

The main body portion of the electropotential detection electrode according to the present invention may be configured as illustrated in FIG. 5 to FIG. 7. In FIG. 5 to FIG. 7, the same or similar members as or to those described in conjunction with FIG. 1 to FIG. 4 are denoted by the same reference signs and detailed description will be omitted as appropriate.

The main body portion 21 illustrated in FIG. 5 to FIG. 7 comprises grooves 61 extending from the annular groove 51 to the small diameter portion 23. The grooves 61 are provided respectively at positions that quarter the large diameter portion 24 in the circumferential direction as illustrated in FIG. 5. The grooves 61 according to this embodiment are provided at the same positions as the cutaways 52 described above in the circumferential direction of the large diameter portion 24.

The grooves 61 are formed by covering concave portions 62 (see FIG. 7) of the disc portion 44 of the base material 41 with the conductor 42. The concave portions 62 extend inward from the annular groove portion 45 of the disc portion 44 in the radial direction, and are formed to be connected to an outer peripheral surface of the cylindrical portion 43, as illustrated in FIG. 7.

The grooves 61 are formed inside the annular groove 51 in the large diameter portion 24 of the main body portion 21 in the radial direction, as illustrated in FIG. 5. Each of the grooves 61 is connected at one end thereof to a bottom surface 51b of the annular groove 51 and at the other end thereof to an outer peripheral surface 23a of the small diameter portion 23, as illustrated in FIG. 6.

In this manner, with the provision of the grooves 61 inside the annular groove 51 in the radial direction, the conductor 42b corresponding to the bottom surface of the annular groove 51 and a conductor 42d corresponding to the outer peripheral surface of the small diameter portion 23 are connected via a conductors 42e corresponding to bottom surfaces of the grooves 61, as illustrated in FIG. 6. Therefore, compared with the case where a conductive path extending over an inner peripheral wall 51c of the annular groove 51 is used, reliability in conduction is further enhanced because one corner that tends to impair the reliability in conduction is eliminated.

Therefore, according to this embodiment, an electropotential detection electrode having higher reliability in conduction may be provided.

DESCRIPTION OF REFERENCE NUMERALS AND SIGNS

11: electropotential detection electrode, 12: electromagnetic flow meter, 13: measurement tube, 19: electrode insertion hole, 21: main body portion, 22: terminal portion, 23: small diameter portion, 23a: outer peripheral surface of small diameter portion, 24: large diameter portion, 25: liquid-contact portion, 41: base material, 42: conductor, 43: cylindrical portion, 44: disc portion, 51: annular groove, 51b: bottom surface of annular groove, 52: cutaway, 61: groove

The invention claimed is:

1. An electropotential detection electrode of an electromagnetic flow meter, comprising:
   a main body portion having a liquid-contact portion configured to be exposed in a measurement tube of the electromagnetic flow meter and being formed by covering a base material with an electrically conductive material; and
   a terminal portion electrically connected to the electrically conductive material, wherein
   the main body portion comprises:
      a small diameter portion having a cylindrical shape and configured to be inserted at one end thereof into an electrode insertion hole of the measurement tube, the one end corresponding to the liquid-contact portion; and
      a large diameter portion having a disc shape extending outward from another end of the small diameter portion in a radial direction, and the large diameter portion comprises:
      an annular groove opening toward an inside the measurement tube, and
      a cutaway extending outward from the annular groove in the radial direction and opening to an outer peripheral surface of the large diameter portion.

2. The electropotential detection electrode of an electromagnetic flow meter according to claim 1,
   wherein the large diameter portion comprises a groove inside the annular groove in the radial direction, the groove being connected at one end thereof to a bottom surface of the annular groove and at another end to an outer peripheral surface of the small diameter portion.

* * * * *